(12) United States Patent
Ichino et al.

(10) Patent No.: US 10,119,017 B2
(45) Date of Patent: Nov. 6, 2018

(54) RESIN COMPOSITION AND SHEET-SHAPED MOLDED BODY THEREOF

(71) Applicant: Asahi Kasei Kabushiki Kaisha, Tokyo (JP)

(72) Inventors: Hiroyuki Ichino, Tokyo (JP); Toshikazu Hoshina, Tokyo (JP); Yasuhiro Kusanose, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 97 days.

(21) Appl. No.: 15/122,974

(22) PCT Filed: Mar. 10, 2015

(86) PCT No.: PCT/JP2015/057056
§ 371 (c)(1),
(2) Date: Sep. 1, 2016

(87) PCT Pub. No.: WO2015/137355
PCT Pub. Date: Sep. 17, 2015

(65) Prior Publication Data
US 2017/0073510 A1  Mar. 16, 2017

(30) Foreign Application Priority Data

Mar. 12, 2014  (JP) .................... 2014-049205

(51) Int. Cl.
| | |
|---|---|
| *C08L 23/16* | (2006.01) |
| *C08L 53/02* | (2006.01) |
| *C08F 297/04* | (2006.01) |
| *C08L 23/14* | (2006.01) |
| *B65D 65/02* | (2006.01) |

(52) U.S. Cl.
CPC ............. *C08L 23/16* (2013.01); *B65D 65/02* (2013.01); *C08F 297/04* (2013.01); *C08L 23/142* (2013.01); *C08L 2205/025* (2013.01)

(58) Field of Classification Search
CPC .... C08F 297/04; C08L 23/142; C08L 53/025; C08L 2205/025; C08L 23/16
See application file for complete search history.

(56) References Cited

U.S. PATENT DOCUMENTS

| | | |
|---|---|---|
| 2005/0249662 A1 | 11/2005 | Dolle |
| 2010/0239802 A1 | 9/2010 | Kuwahara et al. |
| 2012/0010351 A1 | 1/2012 | Araki et al. |
| 2015/0344684 A1 | 12/2015 | Kusanose et al. |

FOREIGN PATENT DOCUMENTS

| | | |
|---|---|---|
| JP | 2000-143889 A | 5/2000 |
| JP | 2003-253066 A | 9/2003 |
| JP | 2010-106200 A | 5/2010 |
| JP | 2010-126636 A | 6/2010 |
| JP | 2010-229348 A | 10/2010 |
| JP | WO2014/002984 A1 | 6/2016 |
| TW | 2010-020289 A | 6/2010 |
| WO | 2004/002984 A2 | 1/2004 |
| WO | 2009/031625 A1 | 3/2009 |
| WO | 2010/104174 A1 | 9/2010 |

OTHER PUBLICATIONS

Yonezawa et al., CAPLUS AN 2000:356298, abstracting JP 2000143889 (May 2000).*
International Search Report issued in corresponding International Patent Application No. PCT/JP2015/057056 dated Jun. 9, 2015.
European Search Report issued in counterpart European Patent Application No. 15761061.9 dated Feb. 6, 2017.
International Preliminary Report on Patentability issued in corresponding International Patent Application No. PCT/JP2015/057056 dated Sep. 13, 2016.

* cited by examiner

*Primary Examiner* — Jeffrey C Mullis
(74) *Attorney, Agent, or Firm* — Morgan, Lewis & Bockius LLP

(57) ABSTRACT

A resin composition according to the present invention contains a polypropylene-based resin (a), a hydrogenated block copolymer (b), and a hydrogenated block copolymer (c) in a particular mass ratio, and the hydrogenated block copolymer (b) and the hydrogenated block copolymer (c) have particular constitution. Moreover, a sheet-shaped molded body according to the present invention contains the resin composition according to the present invention. Furthermore, a packaging material for medical use, foodstuffs or clothes according to the present invention contains the sheet-shaped molded body according to the present invention.

14 Claims, No Drawings

RESIN COMPOSITION AND SHEET-SHAPED MOLDED BODY THEREOF

TECHNICAL FIELD

The present invention relates to a resin composition, a sheet-shaped molded body, and a packaging material for medical use, foodstuffs or clothes.

BACKGROUND ART

A polypropylene-based resin composition is generally excellent in chemical resistance and mechanical properties and therefore is used in a wide field including packaging materials, mechanical parts, and car parts. Moreover, the development of halogen-free transparent polymer materials has been progressing in recent years due to the necessity to deal with environmental problems, and especially in the fields of sheets and films, it is required to make a polypropylene-based resin soft and transparent. Further, heat sealability, flexibility, transparency, shock resistance, and surface smoothness are desired in the medical fields, e.g., for transfusion bags and in the fields of food container-packaging materials and of packaging for clothes. However the polypropylene-based resin composition is inferior in these properties and the use of the polypropylene-based resin composition in these fields has been limited in some cases. In order to solve such a problem, a method involving addition of an elastomer to the polypropylene-based resin is used.

In Patent Literature 1, a composition containing: a polyolefin-based resin; and two kinds of hydrogenated block copolymers each containing a conjugated diene compound and an aromatic vinyl compound and each having a different vinyl content is disclosed, and the composition in which the hydrogenated block copolymer having the higher vinyl content is contained in a range of 10 to 20% by mass is disclosed.

In Patent Literature 2, a polypropylene-based resin composition containing: a polyolefin-based resin; and two kinds of hydrogenated block copolymers each containing a conjugated diene compound and an aromatic vinyl compound and each having a different glass transition temperature and a different content of the aromatic vinyl compound is disclosed.

In Patent Literature 3, a polyolefin-based resin composition containing: a polyolefin-based resin; an aromatic vinyl compound; a hydrogenated block copolymer having a vinyl content of 40 to 90 mol % before hydrogenation; and a polyethylene-based powder is disclosed.

CITATION LIST

Patent Literature

Patent Literature 1: Japanese Patent Laid-Open No. 2000-143889
Patent Literature 2: Japanese Patent Laid-Open No. 2010-106200
Patent Literature 3: International Publication No. WO 2004/002984

SUMMARY OF INVENTION

Technical Problem

However, according to the technique described in Patent Literature 1, when a sheet-shaped molded body is produced, the heat sealability, flexibility, and transparency are not sufficient even though shock resistance at low temperatures as a material for car interior or exterior use is improved. Moreover, according to the technique described in Patent Literature 2, the heat sealability and flexibility are not sufficient when a sheet-shaped molded body is produced. Furthermore, according to the technique described in Patent Literature 3, the heat sealability, shock resistance, and low stickiness are not sufficient when a sheet-shaped molded body is produced.

As described above, the heat sealability, flexibility, transparency, shock resistance, low stickiness, surface smoothness, and so on are listed as properties required of the polypropylene-based resin composition and sheet-shaped molded body thereof in medical fields such as transfusion bags and in packaging fields for foodstuffs or clothes, and the favorable balance among these respective properties is further desired. However, a polypropylene-based resin composition and a sheet-shaped molded body thereof each sufficiently satisfying these respective properties have not been obtained.

The present invention has been completed in consideration of the circumstances and intends to provide a resin composition, a sheet-shaped molded body, and a packaging material for medical use, foodstuffs or clothes each being excellent in the balance among heat sealability, flexibility, transparency, shock resistance, and low stickiness.

Solution to Problem

As a result of diligent studies in order to solve the problems, the present inventors have found that a resin composition containing a polypropylene-based resin and two kinds of particular hydrogenated block copolymers, and a sheet-shaped molded body containing the resin composition can solve the problems, and have completed the present invention.

That is to say, the present invention provides the followings.

[1]

A resin composition comprising:
a polypropylene-based resin (a);
a hydrogenated block copolymer (b); and
a hydrogenated block copolymer (c),
wherein the hydrogenated block copolymer (b) comprises:
  at least one polymer block A comprising an aromatic vinyl compound unit as a main constituent; and
  at least one polymer block B comprising a conjugated diene compound unit as a main constituent,
a total content of the aromatic vinyl compound unit in the hydrogenated block copolymer (b) is 5 to 30% by mass,
80 mol % or more of all the conjugated diene compound units in the hydrogenated block copolymer (b) is hydrogenated,
an amount of vinyl bond of the hydrogenated block copolymer (b) before hydrogenation is more than 60 mol %,
the hydrogenated block copolymer (c) comprises:
  at least one polymer block C comprising an aromatic vinyl compound unit as a main constituent; and
  at least one polymer block D comprising a conjugated diene compound unit as a main constituent,
a total content of the aromatic vinyl compound unit in the hydrogenated block copolymer (c) is 5 to 30% by mass,
80 mol % or more of all the conjugated diene compound units in the hydrogenated block copolymer (c) is hydrogenated, an amount of vinyl bond of the hydrogenated block copolymer (c) before hydrogenation is 40 to 60 mol %, a mass ratio of a content of the hydrogenated block copolymer (b) to a content of the hydrogenated block copolymer (c), (b)/(c), is 20/80 to 80/20, and a mass ratio of a content of the polypropylene-based resin (a) and the total content of the hydrogenated block copolymer (b) and the hydrogenated block copolymer (c), (a)/((b)+(c)), is 40/60 to 90/10.

[2]

The resin composition according to [1], wherein the polypropylene-based resin (a) comprises a propylene-α-olefin random copolymer having a propylene content of 98% by mass or less.

[3]

The resin composition according to [1] or [2], wherein the polypropylene-based resin (a) has a number average molecular weight of 50000 or higher, and the resin composition further comprises 0.01 to 1.5 parts by mass of a polyolefin resin (d) having a number average molecular weight of lower than 50000, based on 100 parts by mass of the total content of the hydrogenated block copolymer (b) and the hydrogenated block copolymer (c).

[4]

The resin composition according to any one of [1] to [3], wherein the polyolefin resin (d) is a homopolymer of ethylene.

[5]

The resin composition according to any one of [1] to [4], wherein the total content of the aromatic vinyl compound unit in the hydrogenated block copolymer (b) is 8 to 17% by mass.

[6]

The resin composition according to any one of [1] to [5], wherein a difference between the total content of the aromatic vinyl compound unit in the hydrogenated block copolymer (b) and the total content of the aromatic vinyl compound unit in the hydrogenated block copolymer (c) is 8% by mass or less, and an average of the total content of the aromatic vinyl compound unit in the hydrogenated block copolymer (b) and the total content of the aromatic vinyl compound unit in the hydrogenated block copolymer (c) is 9 to 20% by mass.

[7]

The resin composition according to any one of [1] to [6], wherein the hydrogenated block copolymer (b) is represented by a structure of A1-B1-A2-B2, A1 and A2 in the structure are included in the polymer block A and are same or different, B1 and B2 in the structure are included in the polymer block B, and a content of B2 in the hydrogenated block copolymer (b) is 0.1 to 9.1% by mass.

[8]

The resin composition according to any one of [1] to [7], wherein the mass ratio, (b)/(c), is 40/60 to 60/40.

[9]

The resin composition according to any one of [1] to [8], wherein the mass ratio, (a)/((b)+(c)), is 60/40 to 80/20.

[10]

The resin composition according to any one of [1] to [9], wherein the content of the hydrogenated block copolymer (b) is more than 5% by mass.

[11]

A sheet-shaped molded body, comprising the resin composition according to any one of [1] to [10].

[12]

The sheet-shaped molded body comprising the resin composition according to any one of [1] to [10], wherein the sheet-shaped molded body has a haze (%) of 4% or less in terms of a thickness of 0.2 mm.

[13]

A packaging material for medical use, foodstuffs or clothes, comprising the sheet-shaped molded body according to [11] or [12].

Advantageous Effects of Invention

According to the present invention, a resin composition, a sheet-shaped molded body, and a packaging material for medical use, foodstuffs or clothes each excellent in the balance among heat sealability, flexibility, transparency, shock resistance, and low stickiness can be provided.

DESCRIPTION OF EMBODIMENTS

Hereinafter, the embodiment for carrying out the present invention (hereinafter, simply referred to as "present embodiment") will be described in detail. The present embodiment below is an example for describing the present invention and is not intended to limit the present invention to the contents below. The present invention can be carried out in any appropriate modified form within the gist thereof.

The resin composition according to the present embodiment comprises a polypropylene-based resin (a), a hydrogenated block copolymer (b), and a hydrogenated block copolymer (c). Further, the resin composition according to the present embodiment is constituted as follows. That is to say, the resin composition according to the present embodiment comprises a polypropylene-based resin (a), a hydrogenated block copolymer (b), and a hydrogenated block copolymer (c); the hydrogenated block copolymer (b) comprises at least one polymer block A comprising an aromatic vinyl compound unit as a main constituent and at least one polymer block B comprising a conjugated diene compound unit as a main constituent; a total content of the aromatic vinyl compound unit in the hydrogenated block copolymer (b) is 5 to 30% by mass; 80 mol % or more of all the conjugated diene compound units in the hydrogenated block copolymer (b) is hydrogenated; an amount of vinyl bond of the hydrogenated block copolymer (b) before hydrogenation is more than 60 mol %; the hydrogenated block copolymer (c) comprises at least one polymer block C comprising an aromatic vinyl compound unit as a main constituent and at least one polymer block D comprising a conjugated diene compound unit as a main constituent; a total content of the aromatic vinyl compound unit in the hydrogenated block copolymer (c) is 5 to 30% by mass; 80 mol % or more of all the conjugated diene compound units in the hydrogenated block copolymer (c) is hydrogenated; an amount of vinyl bond of the hydrogenated block copolymer (c) before hydrogenation is 40 to 60 mol %; a mass ratio of a content of the hydrogenated block copolymer (b) to a content of the hydrogenated block copolymer (c), (b)/(c), is 20/80 to 80/20; and a mass ratio of a content of the polypropylene-based resin (a) to the total content of the hydrogenated block copolymer (b) and the hydrogenated block copolymer (c), (a)/((b)+(c)), is 40/60 to 90/10. The resin composition according to the present embodiment is constituted as described above and therefore is excellent in the balance among heat sealability, flexibility, transparency, shock resistance, and low stickiness. Moreover, the resin composition according to the present embodiment can be made to be excellent in surface smoothness.

<Polypropylene-Based Resin (a)>

Examples of the polypropylene-based resin (a) being the first component for use in the present embodiment include homopolymers of propylene, and block copolymers or random copolymers of propylene and α-olefin. The form of the copolymer in the case where copolymerization is conducted is not particularly limited, and examples of the form include a straight chain structure, a branched structure, a graft structure obtained by a modified product.

In the case where the polypropylene-based resin (a) is a polymer of propylene and α-olefin, examples of the α-olefin include, but not limited to, α-olefins having 20 or less carbon atoms such as ethylene, 1-butene, 1-pentene, 3-methyl-1-butene, 1-hexene, 3-methyl-1-pentene, 4-methyl-1-pentene, 1-heptene, 1-octene, 1-nonene, 1-decene, 1-dodecene, 1-tetradecene, 1-hexadecene, 1-octadecene, and 1-eicosane. These α-olefins can be used alone or in combination of two or more.

Among the polypropylene-based resins (a), it is preferable that the polypropylene-based resin (a) be a propylene-α-olefin random copolymer having a propylene content of 98% by mass or less from the standpoint of making the heat sealability, flexibility, and transparency of the resin composition and sheet-shaped molded body to be obtained more excellent. Among the propylene-α-olefin random copolymers, a propylene-ethylene copolymer or a propylene-1-butene copolymer is preferably used.

The melt flow rate (MFR; 230° C., in accordance with ISO 1133) of the polypropylene-based resin (a) is not particularly limited, but is preferably 0.2 to 100 g/10 min, more preferably 0.5 to 70 g/10 min, further more preferably 1 to 50 g/10 min from the standpoint of processability.

The upper limit of the number average molecular weight of the polypropylene-based resin (a) is not particularly limited as long as the polypropylene-based resin (a) has an MFR within the above-described range, but is preferably 300000. Moreover, the lower limit of the number average molecular weight is preferably 50000 or higher, more preferably 500 or higher from the stand point of dynamic strength of the resin composition and sheet-shaped molded body to be obtained and processability.

The number average molecular weight of the polypropylene-based resin (a) can be measured by a method as will be described later in Examples.

<Hydrogenated Block Copolymer (b)>

The hydrogenated block copolymer (b) being the second component for use in the present embodiment is a hydrogenated block copolymer, in which a block copolymer containing: at least one polymer block A containing an aromatic vinyl compound unit as a main constituent; and at least one polymer block B containing a conjugated diene compound unit as a main constituent, is hydrogenated.

The expression "containing . . . as a main constituent" herein means that a monomer unit of interest is contained in an amount of more than 70% by mass and 100% by mass or less in a polymer block of interest, and that, from the standpoint of making the low stickiness of the resin composition and sheet-shaped molded body to be obtained more favorably, the monomer unit of interest is contained in an amount of preferably 80% by mass or more and 100% by mass or less, more preferably 90% by mass or more and 100% by mass or less in the polymer block of interest.

For example, the polymer block A containing an aromatic vinyl compound unit as a main constituent contains more than 70% by mass of an aromatic vinyl monomer unit in the polymer block A.

Moreover, the term "unit" herein means a unit derived from one compound, which is produced as a result of polymerization of the compound of interest. For example, the term "aromatic vinyl monomer unit" means a unit derived from one aromatic vinyl compound, which is produced as a result of polymerization of the aromatic vinyl compound.

In the present embodiment, the total content of the aromatic vinyl compound unit in the hydrogenated block copolymer (b) is 5 to 30% by mass. The total content of the aromatic vinyl compound unit in the hydrogenated block copolymer (b) is 5% by mass or more from the standpoint of dynamic strength and film-blocking properties of the resin composition and sheet-shaped molded body to be obtained. On the other hand, the total content of the aromatic vinyl compound unit in the hydrogenated block copolymer (b) is 30% by mass or less from the standpoint of flexibility and transparency of the resin composition and sheet-shaped molded body to be obtained. From the same standpoints as described above, the total content of the aromatic vinyl compound unit in the hydrogenated block copolymer (b) is preferably 5 to 20% by mass, more preferably 7 to 19% by mass, further more preferably 8 to 17% by mass.

The total content of the aromatic vinyl compound unit in the hydrogenated block copolymer (b) can be measured by a proton nuclear magnetic resonance ($^1$H-NMR) method. The details will be described later in Examples.

In the present embodiment, 80 mol % or more of all the conjugated diene compound units in the hydrogenated block copolymer (b) is hydrogenated. That is to say, the degree of hydrogenation of all the conjugated diene compound units in the hydrogenated block copolymer (b) (degree of hydrogenation of carbon-carbon double bond originating from conjugated diene compound unit) is 80 mol % or more, preferably 85 mol % or more, more preferably 90 mol % or more. The upper limit is not particularly limited, but is preferably 100 mol % or less. Soluble parameters of the hydrogenated block copolymer (b) and of the polypropylene-based resin (a) get closer by the degree of hydrogenation being 80 mol % or more resulting in favorable dispersion, and therefore the transparency and flexibility of the resin composition and sheet-shaped molded body to be obtained are improved. The degree of hydrogenation can be measured by a proton nuclear magnetic resonance ($^1$H-NMR) method. The details will be described later in Examples.

Moreover, the degree of hydrogenation can be controlled by, for example, the amount of catalyst during hydrogenation. The rate of hydrogenation can be controlled by, for example, the amount of catalyst, the amount of hydrogen fed, pressure, temperature, and so on during hydrogenation In the present embodiment, it is important that the amount of vinyl bond of the hydrogenated block copolymer (b) before hydrogenation be more than 60 mol %. The amount of vinyl bond in all the conjugated diene compound units contained in the hydrogenated block copolymer (b) before hydrogenation is preferably 68 mol % or more, more preferably 70 mol % or more, further more preferably 72 mol % or more, even further more preferably 75 mol % or more from the standpoint of making the transparency and flexibility of the resin composition and sheet-shaped molded body to be obtained more favorable. The upper limit value is preferably 99 mol % or less, more preferably 95 mol % or less from the standpoint of productivity.

The amount of vinyl bond here is defined as the proportion of the conjugated diene before hydrogenation incorporated in the bonding forms of 1,2-bond and 3,4-bond to that in bonding forms of 1,2-bond, 3,4-bond, and 1,4-bond. The amount of vinyl bond contained in all the conjugated diene units before hydrogenation can be measured by a proton nuclear magnetic resonance ($^1$H-NMR) method. The details will be described later in Examples. The method of controlling the amount of vinyl bond will also be described later.

The aromatic vinyl compound is not particularly limited, and examples thereof include aromatic vinyl compounds such as styrene, α-methylstyrene, p-methylstyrene, divinylbenzene, 1,1-diphenylethylene, N,N-dimethyl-p-aminoethylstyrene, and N,N-diethyl-p-aminoethylstyrene. Among these aromatic vinyl compounds, styrene, α-methylstyrene, and 4-methylstyrene are preferably used from the standpoint of availability and productivity.

The polymer block A may be constituted from one aromatic vinyl compound unit or from two or more aromatic vinyl compound units.

The conjugated diene compound is not particularly limited as long as the conjugated diene compound is a diolefin having a pair of conjugated double bonds, and examples of the conjugated diene compound include 1,3-butadiene, 2-methyl-1,3-butadiene (isoprene), 2,3-dimethyl-1,3-butadiene, 1,3-pentadiene, 2-methyl-1,3-pentadiene, and 1,3-hexadiene. Among the conjugated diene compounds, 1,3-butadiene and isoprene are preferably used from the standpoint of availability and productivity. These conjugated diene compounds may be used alone or in combination of two or more.

The melt flow rate (MFR; in accordance with ISO 1133) of the hydrogenated block copolymer (b) is preferably in a range of 0.01 to less than 50 g/10 min, more preferably 0.1 to 20 g/10 min or less, further more preferably 1.0 to 10 g/10 min or less. There is a tendency that the fluidity of the resin composition to be obtained can sufficiently be secured in the case where the melt flow rate is 0.01 g/10 min or more, and there is a tendency that the blocking properties of the resin composition and sheet-shaped molded body to be obtained can sufficiently be secured in the case where the melt flow rate is 50 g/10 min or less.

The structure of the hydrogenated block copolymer (b) may take any form of, for example, linear, branched, radial, and comb-like forms, and can be made to be a suitable structure according to the desired physical properties or the like. It is preferable that the hydrogenated block copolymer (b) have a structure represented by A1-B1-A2-B2 from the standpoint of flexibility and transparency of the resin composition to be obtained and sheet-shaped molded body made of the resin composition. Here, A1 and A2 are included in the polymer block A and may be same or different, and B1 and B2 are included in the polymer block B.

Further, it is preferable that the structures of B1 and B2 be different, and the content of the polymer block B2 present at a terminal is preferably 0.1 to less than 9.1% by mass in terms of a ratio in the hydrogenated block copolymer (b), more preferably 0.3 to 7.5% by mass or less, further more preferably 0.5 to less than 5.0% by mass, from the standpoint of making the flexibility and transparency of the resin composition and sheet-shaped molded body to be obtained more favorable. There is a tendency that the transparency and flexibility of the resin composition and sheet-shaped molded body to be obtained can sufficiently be secured in the case where the content is 0.1% by mass or more, and there is a tendency that the low stickiness of the resin composition and sheet-shaped molded body to be obtained can sufficiently be secured in the case where the content is less than 9.1% by mass. Moreover, in the case where random polymerization occurs at the boundaries between respective blocks, a taper structure in which the composition is gradually changed is included in the structure of the hydrogenated block copolymer (b).

<Hydrogenated Block Copolymer (c)>

The hydrogenated block copolymer (c) being the third component for use in the present embodiment is a hydrogenated block copolymer, in which a block copolymer containing: at least one polymer block C containing an aromatic vinyl compound unit as a main constituent; and at least one polymer block D containing a conjugated diene compound unit as a main constituent, is hydrogenated.

As the aromatic vinyl compound and the conjugated diene compound, the same compounds as in the hydrogenated block copolymer (b) can be used, and the same compounds can preferably be used.

The total content of the aromatic vinyl compound unit in the hydrogenated block copolymer (c) is 5 to 30% by mass. The total content of the aromatic vinyl compound unit in the hydrogenated block copolymer (c) is 5% by mass or more from the standpoint of dynamic strength and film-blocking properties of the resin composition and sheet-shaped molded body to be obtained. On the other hand, the content is 30% by mass or less from the standpoint of flexibility, transparency, and shock resistance of the resin composition and sheet-shaped molded body to be obtained. The total content of the aromatic vinyl compound unit in the hydrogenated block copolymer (c) is preferably 7 to 25% by mass, more preferably 12 to 20% by mass from the same standpoints as described above.

The total content of the aromatic vinyl compound unit in the hydrogenated block copolymer (c) can be determined by the same measurement method as the measurement method for the total content of the aromatic vinyl compound unit in the hydrogenated block copolymer (b).

In the present embodiment, 80 mol % or more of all the conjugated diene compound units in the hydrogenated block copolymer (c) is hydrogenated. That is to say, the degree of hydrogenation of all the conjugated diene compound units in the hydrogenated block copolymer (c) (degree of hydrogenation of carbon-carbon double bond originating from conjugated diene compound unit) is 80 mol % or more, preferably 85 mol % or more, more preferably 90 mol % or more. The upper limit is not particularly limited, but is preferably 100 mol % or less.

Soluble parameters of the hydrogenated block copolymer (c) and the polypropylene-based resin (a) get closer by the degree of hydrogenation being 80 mol % or more resulting in favorable dispersion, and therefore the transparency and flexibility of the polypropylene-based resin composition to be obtained and sheet-shaped molded body made of the polypropylene-based resin composition are improved. The degree of hydrogenation can be measured by a proton nuclear magnetic resonance ($^1$H-NMR) method. Moreover, the degree of hydrogenation of the hydrogenated block copolymer (c) can be controlled by the same method as the method for controlling the hydrogenated block copolymer (b).

In the present embodiment, it is important that the amount of vinyl bond of the hydrogenated block copolymer (c) before hydrogenation be 40 to 60 mol % or more. The amount of vinyl bond in all the conjugated diene compound units contained in the hydrogenated block copolymer (c) before hydrogenation is 40 to 60 mol %, preferably 42 to 58 mol %, more preferably 45 to 55 mol % from the standpoint of the balance between flexibility and shock resistance of the resin composition to be obtained and the sheet-shaped molded body made of the resin composition. That is to say, by using the hydrogenated block copolymer (c) having an averaged amount of vinyl bond contained all the conjugated diene units before hydrogenation within a range of 40 to 60 mol %, the polypropylene-based resin (a), and the hydrogenated block copolymer (b), the balance among respective properties of heat sealability, flexibility, transparency, shock resistance, and low stickiness of the resin composition and sheet-shaped molded body to be obtained becomes favorable. The amount of vinyl bond in the hydrogenated block copolymer (c) can be controlled and measured by the same methods for the hydrogenated block copolymer (b).

It is preferable that the difference between the total content of the aromatic vinyl compound unit in the hydrogenated block copolymer (b) and the total content of the aromatic vinyl compound unit in the hydrogenated block copolymer (c) be 8% by mass or less from the standpoint of heat sealability of the resin composition and sheet-shaped molded body according to the present embodiment. The difference between these contents is more preferably 7% by mass or less, further more preferably 6% by mass or less. It is preferable that the difference between the contents be 8% by mass or less because the tendency that each of the hydrogenated block copolymer (b) and the hydrogenated block copolymer (c) is separately dispersed becomes small and there is a tendency that the balance among respective properties of heat sealability, flexibility, transparency, shock resistance, and low stickiness of the polypropylene-based resin composition to be obtained and sheet-shaped molded body made of the polypropylene-based resin composition is more improved. The lower limit of the difference between the contents is not particularly limited, but is preferably 0% by mass or more, more preferably 0.01% by mass or more. It is preferable that the difference between the contents be 0% by mass from the standpoint of heat sealability of the resin composition and sheet-shaped molded body to be obtained.

The average of the total content of the aromatic vinyl compound unit in the hydrogenated block copolymer (b) and the total content of the aromatic vinyl compound unit in the hydrogenated block copolymer (c) is preferably 9% by mass or more, more preferably 11% by mass or more, further more preferably 13% by mass or more from the standpoint of making the shock resistance and low stickiness of the resin composition and sheet-shaped molded body according to the present embodiment more favorable. On the other hand, the average of the total content of the aromatic vinyl compound unit in the hydrogenated block copolymer (b) and the content of the polymer block C in the hydrogenated block copolymer (c) is preferably 20% by mass or less, more preferably 18% by mass or less, further more preferably 16% by mass or less from the standpoint of making the heat sealability, transparency, and flexibility of the resin composition and sheet-shaped molded body to be obtained more favorable. That is to say, there is a tendency that the balance among respective properties of heat sealability, flexibility, transparency, shock resistance, and low stickiness of the resin composition and sheet-shaped molded body to be obtained is improved in the case where the average of the total content of the aromatic vinyl compound unit in the hydrogenated block copolymer (b) and the total content of the aromatic vinyl compound unit in the hydrogenated block copolymer (c) is 9 to 20% by mass.

The average of the total content of the aromatic vinyl compound unit in the hydrogenated block copolymer (b) and the total content of the aromatic vinyl compound unit in the hydrogenated block copolymer (c) can be determined by the following formula.

{(Total content of aromatic vinyl compound unit in hydrogenated block copolymer (b))+(total content of aromatic vinyl compound unit in hydrogenated block copolymer (c))}/2

The melt flow rate (MFR; in accordance with ISO 1133) of the hydrogenated block copolymer (c) is preferably in a range of 0.01 to less than 50 g/10 min, more preferably 0.1 to 20 g/10 min or less, further more preferably 1.0 to 10 g/10 min or less. There is a tendency that the fluidity of the resin composition to be obtained can sufficiently be secured in the case where the melt flow rate is 0.01 g/10 min or more, and there is a tendency that the blocking properties of the resin composition and sheet-shaped molded body to be obtained can sufficiently be secured in the case where the melt flow rate is 50 g/10 min or less.

The structure of the hydrogenated block copolymer (c) may take any form of, for example, linear, branched, radial, and comb-like forms, and can be made to be a suitable structure according to the desired physical properties or the like. For example, the molecular structure of the hydrogenated block copolymer (b) can also be adopted appropriately in the hydrogenated block copolymer (c). Moreover, the molecular structure of the hydrogenated block copolymer (c) may be the same as or different from the molecular structure of the hydrogenated block copolymer (b).

<Method for Producing Hydrogenated Block Copolymer (b) and Hydrogenated Block Copolymer (c)>

The method for producing the hydrogenated block copolymer (b) and the hydrogenated block copolymer (c) for use in the present embodiment may be any method, however the hydrogenated block copolymer (b) or (c) is generally obtained by conducting living copolymerization in an organic solvent using an organoalkali metal compound as an initiator, and thereafter conducting hydrogenation reaction.

The organic solvent is not particularly limited, however examples thereof include: aliphatic hydrocarbons such as n-butane, isobutane, n-pentane, n-hexane, n-heptane, and n-octane; alicyclic hydrocarbons such as cyclohexane, cycloheptane, and methylcyclopentane; and aromatic hydrocarbons such as benzene, xylene, toluene, and ethylbenzene.

As the organoalkali compound being a polymerization initiator, organolithium compounds are preferable. Examples of the organolithium compound which can be used include, but not limited to, organomonolithium compounds, organodilithium compounds, and organopolylithium compounds. Specific examples of the organolithium compounds include, but not limited to, ethyllithium, n-propyllithium, isopropyllithium, n-butyllithium, sec-butyllithium, t-butyllithium, phenyllithium, hexamethylenedilithium, butadienyllithium, and isopropenyldilithium. Among the organolithium compounds, n-butyllithium and sec-butyllithium are preferable in terms of polymerization activity.

It is generally preferable that the amount of use of organolithium being a polymerization initiator is in a range of 0.01 to 0.5 phm (parts by mass per 100 parts by mass of monomer), more preferably in a range of 0.03 to 0.3 phm, further more preferably in a range of 0.05 to 0.15 phm although the amount depends on the molecular weight of the intended block copolymer.

Moreover, examples of the controller of the amount of vinyl bond of the hydrogenated block copolymer (b) and the hydrogenated block copolymer (c) include Lewis bases (such as, for example, ethers and amines). More specific examples of the Lewis base include, but not limited to, ether derivatives of polyalkylene glycols such as diethyl ether, tetrahydrofuran, propyl ether, butyl ether, higher ethers, ethylene glycol dibutyl ether, diethylene glycol dimethyl ether, propylene glycol diethyl ether, and propylene glycol ethyl propyl ether, examples of the amine include tertiary amines such as pyridine, N,N,N',N'-tetramethylethylenediamine, and tributylamine, and these Lewis bases are used together with the organic solvent. Among these Lewis bases, N,N,N',N'-tetramethylethylenediamine being a tertiary amine is preferable.

The amount used in the case where the tertiary amine is used can be adjusted according to the amount of vinyl bond of the intended hydrogenated block copolymer (b) and hydrogenated block copolymer (c).

The amount of the tertiary amine used in the case where the amount of vinyl bond of the hydrogenated block copolymer (b) before hydrogenation and of the hydrogenated block copolymer (c) before hydrogenation are adjusted to 40 to 60 mol % is not particularly limited, but is preferably in a range of, for example, 0.1 to 0.7 (mol/Li) based on organolithium as a polymerization initiator, more preferably in a range of 0.2 to 0.6 (mol/Li). Moreover, the amount of the tertiary amine used in the case where the amount of vinyl bond before hydrogenation is adjusted so as to be more than 60 mol % is not particularly limited, but is preferably in a range of, for example, more than 0.7 (mol/Li) and 4 (mol/Li) or less, more preferably in a range of 0.8 (mol/Li) or more and 3 (mol/Li) or less, based on organolithium as a polymerization initiator.

In the present embodiment, a sodium alkoxide may be coexisted during block copolymerization. The sodium alkoxide that can be used is not particularly limited, however examples thereof include the compounds represented by the following formula. Among the sodium alkoxides, sodium alkoxides having an alkyl group having 3 to 6 carbon atoms are preferable, and sodium t-butoxide and sodium t-pentoxide are more preferable.

NaOR (wherein R represents an alkyl group having 2 to 12 carbon atoms.)

The amount of sodium alkoxide used in the present embodiment is preferably 0.010 to 0.1 (molar ratio) based on the amount of the tertiary amine used, more preferably 0.010 to 0.08 (molar ratio), further more preferably 0.010 to 0.06 (molar ratio), even further more preferably 0.015 to 0.05 (molar ratio). There is a tendency that the polymer block B and polymer block D, each of which is high in the amount of vinyl bond, are obtained at a higher production rate in the case where the amount of sodium alkoxide used is within the range.

Further, the polymerization reaction, namely a method of block copolymerization of a conjugated diene compound and an aromatic vinyl compound using organolithium as a polymerization initiator, is not particularly limited and may be batch polymerization, continuous polymerization, or combination of batch polymerization and continuous polymerization. The polymerization temperature is generally 0 to 150° C., preferably 20 to 120° C., more preferably 40 to 100° C. The polymerization time is different depending on the intended polymer, but is normally within 24 hours, preferably 0.1 to 10 hours. Moreover, the atmosphere in the polymerization system may be within a pressure range that is sufficient to keep nitrogen and a solvent in a liquid phase and is not particularly limited. Further, it is preferable that an impurity (such as, for example, water, oxygen, or carbonic acid gas), which inactivates an initiator and a living polymer, do not exist in the polymerization system.

In the present embodiment, a coupling agent, with which the block copolymers obtained by the above-described methods are coupled, can also be used for reaction. The coupling agent is not particularly limited, however conventionally known bifunctional coupling agents can be applied, and examples of the bifunctional coupling agent include: alkoxy silane compounds such as trimethoxysilane, triethoxysilane, tetramethoxysilane, tetraethoxysilane, dimethyldimethoxysilane, diethyldimethoxysilane, dichlorodimethoxysilane, dichlorodiethoxysilane, trichloromethoxysilane, and trichloroethoxysilane; dihalogen compounds such as dichloroethane, dibromoethane, dimethyldichlorosilane, and dimethyldibromosilane; and acid esters such as methyl benzoate, ethyl benzoate, phenyl benzoate, and phthalic acid esters.

Moreover, trifunctional or higher multifunctional coupling agent is not also particularly limited, conventionally known trifunctional or higher multifunctional coupling agents can be applied, and examples thereof include: trivalent or higher polyalcohols; polyvalent epoxy compounds such as epoxidized soybean oil, diglycidyl bisphenol A, and 1,3-bis(N,N-diglycidylaminomethyl)cyclohexane; halogenated silicon compounds represented by the formula $R_{4-n}SiX_n$, wherein R represents a hydrocarbon group having 1 to 20 carbon atoms, X represents a halogen, and n represents an integer of 3 to 4 (for example, methyl silyl trichloride, t-butyl silyl trichloride, and silicon tetrachloride, and brominated compounds thereof); and halogenated tin compounds represented by the formula $R_{4-n}SnX_n$, wherein R represents a hydrocarbon group having 1 to 20 carbon atoms, X represents halogen, and n represents an integer of 3 to 4 (for example, polyvalent halogen compounds such as methyltin trichloride, t-butyltin trichloride, and tin tetrachloride). Moreover, examples of other trifunctional or higher multifunctional coupling agent include dimethyl carbonate and diethyl carbonate.

A double bond residue of the conjugated diene compound unit is hydrogenated through hydrogenation of the polymerized block copolymer by supplying hydrogen in the presence of a hydrogenation catalyst, and thus the hydrogenated block copolymer in the present embodiment can be obtained. The hydrogenation catalyst used is not particularly limited, however examples thereof include titanocene compounds, reductive organometal compounds, and a mixture of the titanocene compound and the reductive organometal compound. The titanocene compound is not particularly limited, however, for example, a compound described in Japanese Patent Laid-Open No. 8-109219 can be used. Specific examples thereof include, but not particularly limited to, compounds having at least one ligand having a (substituted) cyclopentadienyl skeleton, indenyl skeleton, or fluorenyl skeleton, such as biscyclopentadienyl titanium dichloride and monopentamethylcyclopentanedienyl titanium trichloride. Moreover, the reductive organometal compound is not particularly limited, however examples thereof include: organoalkali metal compounds such as organolithium; organomagnesium compounds; organoaluminum compounds; organoboron compounds; and organozinc compounds. In the present embodiment, hydrogenation reaction is generally conducted at 0 to 200° C. and is preferably conducted in a temperature range of 30 to 150° C.

The pressure of hydrogen used for hydrogenation reaction is generally in a range of 0.1 to 15 MPa, preferably in a range of 0.2 to 10 MPa, more preferably in a range of 0.3 to 5 MPa. Moreover, the hydrogenation reaction time is normally 3 minutes to 10 hours, preferably 10 minutes to 5 hours. The hydrogenation reaction can be conducted by any of a batch process, a continuous process, and combination thereof.

A catalyst residue can be removed as necessary from the solution of the hydrogenated block copolymer obtained in the manner as described above and the copolymer can be separated from the solution. Examples of the method of separating a solvent include a method of collecting a polymer by adding to the reaction liquid a polar solvent to be a poor solvent to the copolymer, such as acetone, or an alcohol, to precipitate the polymer, and a method of distilling a solvent by directly heating the polymer solution. It is to be noted that stabilizers such as various kinds of phenol-based stabilizers, phosphorus-based stabilizers, sulfur-based stabilizers, and amine-based stabilizers can also be added to the hydrogenated block copolymer for use in the present embodiment.

A pellet of the hydrogenated block copolymer (b) and hydrogenated block copolymer (c) can be produced by using a conventionally known method to form a pellet from the hydrogenated block copolymer (b) and hydrogenated block copolymer (c) thus obtained.

Examples of the method of forming a pellet include, but not limited to, a method including extruding the hydrogenated block copolymer (b) and/or the hydrogenated block copolymer (c) in a strand form from a single screw or twin screw extruder and cutting the extruded product in water with a rotary blade installed at the front face of a die portion; a method including extruding the hydrogenated block copolymer (b) and/or the hydrogenated block copolymer (c) in a strand form from a single screw or twin screw extruder and cutting the extruded product with a strand cutter after water cooling or air cooling; and a method including shaping the hydrogenated block copolymer (b) and/or the hydrogenated block copolymer (c) into a sheet form with a roll after melt blending with an open roll and a Banbury mixer, further, cutting the sheet into a strip form, and thereafter cutting the strip-formed sheet into a cuboidal pellet with a pelletizer. It is to be noted that the size and shape of a pellet molded body of the hydrogenated block copolymer (b) and hydrogenated block copolymer (c) are not particularly limited.

An antiblocking agent for pellets can be blended as necessary in the hydrogenated block copolymer (b) and hydrogenated block copolymer (c), preferably in the pellet thereof in order to prevent blocking of pellets. Examples of the antiblocking agent for pellets include, but not limited to, calcium stearate, magnesium stearate, zinc stearate, polyethylene, ethylene bis stearylamide, talc, and amorphous silica. Calcium stearate and polyethylene are preferable from the standpoint of transparency of the resin composition and sheet-shaped molded body to be obtained.

<Resin Composition>

The constitution of the resin composition according to the present embodiment is as described above. It is to be noted that the ratio of the content of the hydrogenated block copolymer (b) to the content of the hydrogenated block copolymer (c), (b)/(c), in the resin composition according to the present embodiment is in a range of 20/80 to 80/20, preferably 30/70 to 70/30. The ratio (b)/(c) is 20/80 or more from the standpoint of flexibility and transparency of the resin composition and sheet-shaped molded body to be obtained. On the other hand, the ratio (b)/(c) is 80/20 or less from the standpoint of shock resistance and low stickiness of the resin composition and sheet-shaped molded body to be obtained. Further, it is more preferable that the ratio, (b)/(c), be in a range of 40/60 to 60/40 from the standpoint of making the heat sealability of the resin composition and sheet-shaped molded body to be obtained more favorable.

In the present embodiment, the mass ratio of the content of the polypropylene-based resin (a) to the total content of the hydrogenated block copolymer (b) and the hydrogenated block copolymer (c), (a)/((b)+(c)), is in a range of 40/60 to 90/10. The mass ratio (a)/((b)+(c)) is 40/60 or more from the standpoint of antiblocking properties of the resin composition and sheet-shaped molded body to be obtained. On the other hand, the mass ratio is 90/10 or less from the standpoint of heat sealability, flexibility, and transparency of the sheet-shaped molded body made of the resin composition to be obtained. The mass ratio is preferably 50/50 to 80/20, more preferably 60/40 to 80/20, further more preferably 60/40 to 75/25, even further more preferably 60/40 to 70/30 from the same standpoints as described above.

Moreover, the content of the hydrogenated block copolymer (b) in the resin composition according to the present embodiment is preferably more than 5% by mass, more preferably 8% by mass or more from the standpoint of flexibility and transparency. Furthermore, the upper limit value of the content of the hydrogenated block copolymer (b) is not particularly limited, but is preferably 48% by mass or less.

<Polyolefin Resin (d)>

It is preferable that the resin composition according to the present embodiment contain a polyolefin resin (d) having a number average molecular weight of lower than 50000 as the fourth component from the standpoint of transparency and surface smoothness. In this case, the polypropylene-based resin (a) has a number average molecular weight of 50000 or higher.

Examples of the polyolefin resin (d) include, but not limited to, homopolymers of propylene, homopolymers of ethylene, block copolymers or random copolymers of propylene and ethylene, and block copolymers or random copolymers of propylene and/or ethylene, and α-olefin. Among these polyolefin resins, homopolymers of ethylene are preferably used from the standpoint of transparency and surface smoothness of the resin composition and sheet-shaped molded body to be obtained.

The polyolefin resin (d) has a number average molecular weight of lower than 50000. The polyolefin resin (d) preferably has a number average molecular weight of 15000 or lower, more preferably 1000 to 15000, further more preferably 1000 to 10000, even further more preferably 1000 to 5000, still further more preferably 1000 to 3000 from the standpoint of transparency and surface smoothness of the resin composition and sheet-shaped molded body to be obtained.

Moreover, the number of peaks on the molecular weight distribution curve of the polyolefin resin (d) may be one, two, or multiple as long as the number average molecular weight is lower than 50000. By using such a polyolefin resin (d), there is a tendency that the transparency and surface smoothness of the resin composition and sheet-shaped molded body to be obtained are excellent. It is to be noted that the molecular weight of the polyolefin resin (d) is a number average molecular weight determined based on the molecular weight at the peak of the chromatogram obtained by the measurement by GPC and the calibration curve determined from the measurement of commercially available standard polystyrenes (made using molecular weight at a peak of molecular weight distribution of standard polystyrenes).

It is preferable that the shape of the polyolefin resin (d) be a particle (powder) from the standpoint of transparency and surface smoothness of the resin composition and sheet-shaped molded body to be obtained.

Further, the polyolefin resin (d) preferably has an average particle diameter of 1 to 15 μm, more preferably 1 to 10 μm, further more preferably 2 to 8 μm. There is a tendency that the transparency, surface smoothness, and so on of the resin composition and sheet-shaped molded body to be obtained become more favorable by the average particle diameter being within the range.

Furthermore, the polyolefin resin (d) preferably has a maximum particle diameter (<99.9%) of 30 μm or less, more preferably 28 μm or less, further more preferably 26 μm or less, even further more preferably 24 μm or less. There is a tendency that the transparency, surface smoothness, and so on of the resin composition and sheet-shaped molded body to be obtained become more favorable by the maximum particle diameter being within the above-described range. It is to be noted that the "average particle diameter" and the "maximum particle diameter" can be measured using a laser diffraction scattering type particle size distribution measuring apparatus. Moreover, the "average particle diameter" means a particle diameter where the integrated value reaches 50% in the mass distribution of measured values.

In the present embodiment, the content of the polyolefin resin (d) is preferably in a range of 0.01 to 1.5 parts by mass based on 100 parts by mass of the total content of the hydrogenated block copolymer (b) and the hydrogenated block copolymer (c), more preferably 0.05 to 1.0 part by mass, further more preferably 0.1 to 0.8 parts by mass, even further more preferably 0.2 to 0.6 parts by mass from the standpoint of transparency, surface smoothness, and so on of the resin composition and sheet-shaped molded body to be obtained.

The resin composition according to the present embodiment may further contain other additives according to required performance. The additive is not particularly limited, and examples thereof include a flame retardant, a stabilizer, a coloring agent, a pigment, an antioxidant, an antistatic agent, a dispersant, a flow enhancer, a surface lubricant such as a metal salt of stearic acid, silicone oil, a mineral oil-based softening agent, a synthetic resin-based softening agent, a copper inhibitor, a crosslinking agent, and a nucleating agent.

<Method for Producing Resin Composition>

Examples of the method for producing the resin composition include a method including dry-blending the polypropylene-based resin composition (a), the hydrogenated block copolymer (b), the hydrogenated block copolymer (c), and, as necessary, the polyolefin resin (d) and other components according to the composition ratio of each component, and a preparation method with an apparatus usually used for mixing polymer materials. Examples of the mixing apparatus include, but not limited to, kneading apparatuses such as a Banbury mixer, Labo Plastomill, a single screw extruder, and a twin screw extruder. The melt blending method with an extruder is preferable from the standpoint of productivity and favorable kneadability. The melting temperature during kneading can appropriately be set, but is normally in a range of 130 to 300° C., preferably in a range of 150 to 250° C.

<Sheet-Shaped Molded Body>

The sheet-shaped molded body according to the present embodiment contains the resin composition according to the present embodiment. The sheet-shaped molded body according to the present embodiment is molded in a desired shape by the method described below. The method for producing the sheet-shaped molded body according to the present embodiment is not particularly limited. For example, a T-die method, an inflation method can be adopted as an extrusion molding method, and a normal air cooling inflation molding, air cooling two-step inflation molding, high-speed inflation molding, water cooling inflation molding, or the like can be adopted as inflation molding. Besides, a blow molding method such as direct blow and injection blow, or a press molding method can also be adopted.

As the molding method, various kinds of molding methods described above are applicable, and, among these molding methods, the T-die molding method and the inflation molding method are particularly preferable because the sheet-shaped molded body according to the present embodiment is excellent in bubble stability and suppression of draw down. The T-die molding method is more preferable from the economic standpoint.

Generally, a sheet-shaped molded body having a thickness of 0.005 mm or more and less than 0.3 mm is referred to as a film, and a sheet-shaped molded body having a thickness of 0.3 mm or more and 50 mm or less is referred to as a sheet. The sheet-shaped molded body according to the present embodiment includes the film and the sheet.

The thickness of the sheet-shaped molded body according to the present embodiment is not particularly limited, but is preferably within a range of 0.005 mm to 0.5 mm, more preferably 0.01 mm to 0.3 mm from the standpoint of molding processability, transparency, and surface smoothness. In the case where the sheet-shaped molded body has a thickness of 0.005 mm or more, there is a tendency that the sheet-shaped molded body is insusceptible to the surface roughness of a cooling roll and that the sheet-shaped molded body has a more favorable surface smoothness and the sheet-shaped molded body excellent in transparency is obtained. In the case where the sheet-shaped molded body has a thickness of 0.5 mm or less, there is a tendency that the temperature control of the surface of the sheet-shaped molded body through a cooling roll becomes easy and that the sheet-shaped molded body has a more favorable surface smoothness and the sheet-shaped molded body excellent in transparency is obtained.

In the present embodiment, the extrusion temperature in producing a sheet-shaped molded body by a T-die method can appropriately be set, but is normally within a range of 130 to 300° C., preferably 180 to 250° C. In the present embodiment, the sheet-shaped molded body extruded from the T-die is, for example, held between the cooling rolls and pressurized, cooled, and transported to the next apparatus. Here, the cooling roll may be at least one. However it is preferable that there be a plurality of cooling rolls, and, for example, in the case where there is two pairs of cooling rolls consisting of the first roll and the second roll, the sheet-shaped molded body is held between the cooling rolls and pressurized, cooled, and transported to the next apparatus through the second roll. In the present embodiment, the cooling roll means a roll with which the surface temperature can be adjusted using a refrigerant. A melt extrusion product ejected from a T-die makes contact with the cooling roll and cooled to the surface temperature of the cooling roll. The surface material of the cooling roll is not particularly limited, and suitable examples thereof include chromium plating. In this case, it is preferable that the surface temperature of the cooling roll be adjusted to 35 to 85° C. from the standpoint of making the transparency of the sheet-shaped molded body to be obtained favorable. The surface temperature of the cooling roll is held at more preferably 45 to 75° C., further more preferably 55 to 65° C. from the same standpoint. There is a tendency that supercooling of the molten resin composition can be prevented and trouble such as occurrence of a horizontal stripe due to contraction can effectively be prevented in the case where the temperature of the cooling roll is 35° C. or higher. That is to say, there is a tendency that the deterioration in the surface state of the sheet-shaped molded body to be obtained can be prevented and favorable transparency is secured. Moreover, there is a tendency that an increase of tack strength of the molten resin composition to the cooling roll can be prevented and lowering of the releasability can effectively be prevented in the case where the temperature of the cooling roll is 85° C. or lower. That is to say, there is a tendency that the deterioration in the surface state of the sheet-shaped molded body to be obtained can be prevented and favorable transparency is secured. In the case where there are a plurality of cooling rolls, it is preferable to adjust the surface temperature of the first roll to 35 to 85° C., and the surface temperature of the second roll is not particularly limited, but is preferably 35 to 85° C. After the sheet-shaped molded body is held between cooling rolls and pressurized, the sheet-shaped molded body is transported to a take-off roll. In transporting the sheet-shaped molded body to the take-off roll, there is a tendency that the shift to the take-off roll can smoothly be conducted and occurrence of roughness on the released surface can be prevented by adjusting the tack strength of the sheet-shaped molded body to the cooling roll so as not to become too large. That is to say, there is a tendency that the transparency of the sheet-shaped molded body to be obtained can be made to be more favorable. From such a standpoint, it is preferable that the tack strength to the cooling roll be made to be in a suitable range to make a state where the shift of the sheet-shaped molded body to the take-off roll can be conducted more smoothly by controlling the surface temperature of the cooling roll in the above-described temperature range. The method of controlling the surface temperature of the cooling roll is not particularly limited, and a normally conducted method, for example, a method including circulating a heat medium such as warm water, pressurized steam, or heated oil in a jacket installed inside the roll, is used.

The surface temperature of the roll in the present embodiment is a temperature of the surface of the roll at a portion repeatedly making contact with the sheet-shaped molded body and was measured with an infrared thermometer or the like. Further, in the case where a film is produced by a T-die method, it is preferable that the opening of a T-die lip be 0.2 mm to 1 mm from the standpoint of obtaining a sheet-shaped molded body having an excellent surface smoothness, a small thermal contraction, and, further, an excellent transparency. That is to say, the opening of the T-die lip is preferably 0.2 mm or more, more preferably 0.4 mm or more. Moreover, the opening of the T-die lip is preferably 1 mm or less, more preferably 0.8 mm or less from the standpoint of obtaining a sheet-shaped molded body having a small fluctuation of film thickness in a width direction. By cooling the resin composition, which is extruded from the T-die, using the cooling roll (the temperature of which is controlled in the above-described temperature condition), there is a tendency that a sheet-shaped molded body, in which wrinkles, deformation and so on due to excessive contraction do not occur and the surface state is favorable, and which is excellent in transparency, is produced.

It is preferable that the sheet-shaped molded body according to the present embodiment have a haze (%) of 4% or less in terms of a thickness of 0.2 mm. Generally, the transparency of a sheet-shaped molded body is evaluated by a haze value. The haze value is conceptually represented by a sum of a light-scattering property (external haze value) on the surface of a flat test piece obtained by cutting the sheet-shaped molded body and a light-scattering property (internal haze value) inside the test piece. It is difficult to evaluate the haze value when the thickness (hereinafter, "thickness" means "thickness (mm) of sheet-shaped molded body" unless otherwise noted) of the sheet-shaped molded body is changed, or, further, when sheets are stacked. However when the sample for measuring the haze value is a uniform test piece (test piece obtained from molded bodies uniformly molded under the same molding condition), there is a proportional relationship between the thickness and the haze value.

The haze in terms of thickness specified in the sheet-shaped molded body according to the present embodiment is defined as a ratio of the haze value (%) to the thickness (mm) (referred to as haze in terms of thickness (%/mm)).

The sheet-shaped molded body according to the present embodiment preferably has a haze value of 4% or less in terms of a thickness of 0.2 mm, more preferably 3% or less, further more preferably 2% or less from the standpoint of surface smoothness and transparency. The lower limit is not particularly limited, but is preferably 0% or more, more preferably 0.01% or more.

Here, the haze value in terms of a thickness of 0.2 mm is a converted value obtained by converting the haze value of a test piece sample of a sheet-shaped molded body the thickness of which is measured in advance into a haze value in the case where the sheet-shaped molded body is assumed to be a sheet-shaped molded body having a thickness of 0.2 mm, and can be determined by the following formula.

$$H_{0.2}(\%) = H \times 0.2/d$$

wherein,
$H_{0.2}$: haze value (%) in terms of thickness of 0.2 mm
H: measured haze value (%)
d: thickness (mm) of sheet-shaped molded body at haze-measuring portion The sheet-shaped molded body according to the present embodiment having a haze (%) in terms of a thickness of 0.2 mm of 4% or less can be obtained by, for example, adding the polyolefin resin (d) component to the resin composition according to the present embodiment and, further, setting the surface temperature of the cooling roll to 35 to 85° C. in producing the sheet-shaped molded body.

As described previously, there is a tendency that the surface smoothness of the resin composition is improved by the addition of the polyolefin resin (d) component having a number average molecular weight of less than 50000. Further, the transparency can be improved by controlling, at a particular temperature, the temperature of the cooling roll in a take-off step during the production of a sheet-shaped molded body.

The sheet-shaped molded body according to the present embodiment is excellent in heat sealability, flexibility, transparency, shock resistance, low stickiness, and surface smoothness as will be shown in Examples described later and can be used without limitation of use application. By utilizing the characteristics, the sheet-shaped molded body according to the present embodiment can suitably be used in a wide range of use applications such as packaging of various kinds of clothes, packaging of various kinds of foodstuffs, packaging of miscellaneous daily goods, packaging of industrial materials, lamination of various kinds of rubber products, resin products, leather products, and so on, elastic tapes for use in paper diapers and so on, industrial products such as dicing films, protective films used for protecting building materials or steel boards, base materials for tacky films, trays for meat and fish, packs for vegetables and fruits, sheet products such as containers for frozen food, use applications for home appliances such as TV sets, stereos, and cleaners, materials for use in car interior or exterior parts such as bumper parts, body panels, and side seals, road paving materials, waterproof materials, water-shielding sheets, packings for civil engineering, daily goods, leisure goods, toys and games, industrial goods, furniture supplies, stationery products such as writing utensils, clear pockets, folders, and spines of files, and medical supplies such as transfusion bags. Among these, the sheet-shaped molded body according to the present embodiment can suitably be used utilizing the properties such as heat sealability, flexibility, transparency, shock resistance, low stickiness, and surface smoothness particularly as a packaging material for medical use, various kinds of foodstuffs or clothes. That is to say, the packaging material for medical use, foodstuffs or clothes according to the present embodiment includes the sheet-shaped molded body according to the present embodiment.

EXAMPLES

Hereinafter, the present embodiment will be described specifically by Examples, but the present embodiment is not limited to these Examples.

In Examples and Comparative Examples, hydrogenated block copolymers were prepared, polypropylene-based resin compositions were produced, and the physical properties were compared, by the methods described below. In making the comparison, the characteristics of the hydrogenated block copolymers and the physical properties of the polypropylene-based resin compositions were measured as follows.

[Measurement Method]
1) Total Content (hereinafter, also referred to as "styrene content") of Aromatic Vinyl Compound Unit in Hydrogenated Block Copolymer (b) and Total Content of Aromatic Vinyl Compound Unit in Hydrogenated Block Copolymer (c)

The total content of the aromatic vinyl compound unit in the hydrogenated block copolymer (b) and the total content of the aromatic vinyl compound unit in the hydrogenated block copolymer (c) were measured using polymers before hydrogenation by a proton nuclear magnetic resonance ($^1$H-NMR) method. The measurement was conducted using JNM-LA400 (manufactured by JEOL Ltd.) as a measurement apparatus, deuterated chloroform as a solvent, and tetramethyl silane as a standard of chemical shifts under the conditions of a sample concentration of 50 mg/mL, an observed frequency of 400 MHz, a pulse delay of 2.904 seconds, a number of scans of 64 times, a pule width of 45°, and a measurement temperature of 26° C. The styrene content was calculated using the total integrated value of signals from aromatic styrene at 6.2 to 7.5 ppm in a spectrum.

2) Amount of Vinyl Bond of Hydrogenated Block Copolymer (b) and of Hydrogenated Block Copolymer (c)

The amount of vinyl bond of the hydrogenated block copolymer (b) and of the hydrogenated block copolymer (c) were measured using a polymer after hydrogenation by a proton nuclear magnetic resonance ($^1$H-NMR) method. The measurement conditions and the processing method of measured data were the same as in 1). The amount of vinyl bond was calculated from a ratio of 1,4-bond to 1,2-bond (in the case of butadiene, and 3,4-bond in the case of isoprene) after calculating an integrated value per 1H of each bond form from the integrated values of signals ascribed to 1,4-bond and 1,2-bond.

3) Degree of Hydrogenation of Unsaturated Bond Based on Conjugated Diene Compound Unit The degree of hydrogenation of the unsaturated bond based on the conjugated diene compound unit was measured using a polymer after hydrogenation by proton nuclear magnetic resonance ($^1$H-NMR). The measurement conditions and the processing method of measured data were the same as in 1). The integrated value of a signal originating from a residual double bond at 4.5 to 5.5 ppm and of a signal originating from the hydrogenated conjugated diene were calculated, and the ratio thereof were calculated as the degree of hydrogenation.

4) Measurement of Number Average Molecular Weight, Weight Average Molecular Weight, and Molecular Weight Distribution The number average molecular weight and weight average molecular weight of the hydrogenated block copolymer (b) and of the hydrogenated block copolymer (c) were determined as the molecular weights in terms of polystyrene with commercial standard polystyrenes by gel permeation chromatography (GPC) measurement (LC-10, manufactured by Shimadzu Corporation) with columns: TSK gel GMHXL (4.6 mmID×30 cm, 2 columns) and a solvent: tetrahydrofuran (THF). Moreover, the molecular weight distribution of the hydrogenated block copolymer (b) and of the hydrogenated block copolymer (c) were determined as the ratio of the obtained number average molecular weight and weight average molecular weight.

The number average molecular weight of the polyolefin resin (d) was determined as the molecular weight in terms of polystyrene with commercial standard polystyrenes by gel permeation chromatography (GPC) measurement (HLC-8121 GPC/HT, manufactured by Tosoh Corporation) with columns: TSK gel GMHHR (7.8 mmID×30 cm, two columns) and a solvent: o-dichlorobenzene (o-DCB).

5) Melt Flow Rate (Hereinafter, Also Written as "MFR")

The MFR of the hydrogenated block copolymer (b) and of the hydrogenated block copolymer (c) were measured in accordance with ISO 1133 at 230° C. and a load of 2.16 Kg.

6) Haze in Terms of Thickness of 0.2 mm

A paraffin oil was applied on the surface of a sheet-shaped molded body, the thickness of which was measured in advance, to erase the irregularity on the surface, and thereafter the haze value was measured with a haze meter (NDH-1001 DP, manufactured by Nippon Denshoku Industries Co., Ltd.). The measurement was conducted 3 times per 1 level, and the haze value (%) in terms of a thickness of 0.2 mm was determined as a converted value in the case where the thickness was assumed to be 0.2 mm from the average value of 3 measurements. The conversion expression was as follows.

$$H_{0.2}(\%) = H \times 0.2/d$$

wherein,
$H_{0.2}$: haze value (%) in terms of thickness of 0.2 mm
H: measured haze value (%) of sheet-shaped molded body
d: thickness (mm) of sheet-shaped molded body at haze-measuring portion 7) Heat Sealability Two sheets of sheet-shaped molded bodies having a thickness of about 0.25 mm and obtained in each of Examples and Comparative Examples were laminated, and then heat-sealed by single side heating with a heat sealer (TP-701-B, manufactured by Tester Sangyo Co., Ltd.: sealing temperature of 160° C., sealing time of 5 seconds, and actual pressure of 0.2 MPa). The obtained sample was left to stand at 23° C. for 24 hours or longer, then a test piece having a width of 15 mm was cut in an orthogonal direction to a width direction of the seal to obtain a test piece having a 10 mm×15 mm seal portion. Subsequently, the seal portion of the test piece was peeled at a peeling angle of 180° with a tension tester (TGE-500N, Minebea Co., Ltd.) at a rate of 200 mm/min to measure the heat seal strength per 15 mm width (N/15 mm) to be used as an index of heat sealability. Evaluation was conducted by the obtained heat seal strength according to the following criteria.

⊚: heat seal strength of 25 N/15 mm or more
○: heat seal strength of 15 N/15 mm or more and less than 25 N/15 mm
Δ: heat seal strength of 10 N/15 mm or more and less than 15 N/15 mm
x: heat seal strength of less than 10N/15 mm 8) Flexibility The sheet-shaped molded body having a thickness of about 0.25 mm and obtained in each of Examples and Comparative Examples was used and punched in accordance with JIS K6251 to make JIS No. 5 test piece, and tensile modulus (MPa) was measured at a tension rate of 200 mm/min, and used as an index of flexibility. Evaluation was conducted by the obtained tensile modulus according to the following criteria.

⊚: tensile modulus of less than 400 MPa
○: tensile modulus of 400 MPa or more and less than 600 MPa
Δ: tensile modulus of 600 MPa or more and less than 800 MPa
x: tensile modulus of 800 MPa or more 9) Transparency The total light transmittance (%) was measured using a sheet-shaped molded body having a thickness of about 0.2 mm and obtained in each of Examples and Comparative Examples with a haze meter (NDH-1001 DP, manufactured by Nippon Densyoku Industries Co., Ltd.) and used as an index of transparency. Evaluation was conducted by the obtained total light transmittance according to the following criteria.

⊚: total light transmittance of 95% or more
○: total light transmittance of 92.5% or more and less than 95%
Δ: total light transmittance of 90% or more and less than 92.5%
x: total light transmittance of less than 90%

10) Shock Resistance

The sheet-shaped molded body having a thickness of about 0.25 mm and obtained in each of Examples and Comparative Examples was used and cut into a length of about 30 cm and a width of about 30 cm, and dart impact test was conducted in accordance with JIS K7124 under the following conditions to measure the impact strength (J) to be used as an index of shock resistance. Evaluation was conducted by the obtained impact strength according to the following criteria.

⊚: impact strength of 35 J or more
○: impact strength of 32 J or more and less than 35 J
Δ: impact strength of 28 J or more and less than 32 J
x: impact strength of less than 28 J 11) Low Stickiness The sheet-shaped molded body having a thickness of about 0.5 mm and obtained in each of Examples and Comparative Examples were cut to make 5 cm×8 cm and 4 cm×6 cm test pieces. Two sheets of the obtained test pieces were laminated (upper face: 5 cm×8 cm and lower face: 4 cm×5 cm), and then 500 g of a load (size: 6 cm×10 cm×1 cm) was placed on the upper face and was made to stand still for 60 seconds, and thereafter the tack strength (J) was measured when the test pieces were peeled at a peel angle of 180° with a tension tester (Tg-5 kN, Minebea Co., Ltd.) at a rate of 100 mm/min, and used as an index of low stickiness. Evaluation was conducted by the obtained tack strength according to the following criteria.

⊚: tack strength of less than 5 N
○: tack strength of 5 N or more and less than 10 N
Δ: tack strength of 10 N or more and less than 15 N
x: tack strength of 15 N or more 12) Surface Smoothness The surface roughness (average roughness of ten points: $R_z$) (μm) was measured using the sheet-shaped molded body having a thickness of 0.25 mm and obtained in each of Examples and Comparative Examples with a laser microscope (product name "VK-X8500", manufactured by Keyence Corporation). Evaluation was conducted by the obtained surface roughness according to the following criteria.

⊚: surface roughness of less than 20 μm
○: surface roughness of 20 μm or more and less than 35 μm
Δ: surface roughness of 35 μm or more and less than 50 μm
x: surface roughness of less than 50 μm or more

[Starting Materials Used]

The polypropylene-based resins (a), hydrogenated block copolymers (b), hydrogenated block copolymers (c), and polyolefin resins (d) used in the Examples and the Comparative Examples were as follows.

<Polypropylene-Based Resins (a)>

PP (1): propylene-ethylene random copolymer ["EG6D" (trade name), manufactured by Japan Polypropylene Corporation, MFR=1.9/10 min, and number average molecular weight of 110000]

PP (2): propylene homopolymer ["PL 500A" (trade name), manufactured by SunAllomer Ltd., MFR=3.0/10 min, and number average molecular weight=85000]

<Hydrogenated Block Copolymers (b) and Hydrogenated Block Copolymers (c)>

(Preparation of Hydrogenation Catalyst)

The hydrogenation catalyst used for hydrogenation reaction of the hydrogenated block copolymers (b) and of hydrogenated block copolymers (C) were prepared by the following method. In a reaction container, the inside of which was replaced with nitrogen, 1 L of dried and purified cyclohexane was charged, 100 mmol of bis(η5-cyclopentadienyl)titaniumdichloride was added thereto, a n-hexane solution containing 200 mmol of trimethylaluminum was added thereto under sufficient stirring, and the resultant mixture was subjected to reaction at room temperature for 3 days.

[Preparation of Hydrogenated Block Copolymers (b)]

<Hydrogenated Block Copolymer (b-1)>

Batch polymerization was conducted using a vessel type reactor provided with a stirring apparatus and a jacket and having an internal volume of 10 L. First of all, 1 L of cyclohexane was charged, then 0.065 parts by mass of n-butyllithium (hereinafter, written as Bu-Li) based on 100 parts by mass of all the monomers, 1.8 mol of N,N,N',N'-tetramethylethylenediamine (hereinafter, written as TMEDA) based on 1 mol of Bu-Li, and 0.04 mol of sodium t-pentoxide (hereinafter, written as NaOAm) based on 1 mol of TMEDA were added. As the first step, a cyclohexane solution (having a concentration of 20% by mass) containing 6.5 parts by mass of styrene was put in over 10 minutes, and thereafter polymerization was conducted for further 10 minutes. In addition, the temperature was controlled at 60° C. during polymerization. Subsequently, as the second step, a cyclohexane solution (having a concentration of 20% by mass) containing 82 parts by mass of butadiene was put in over 60 minutes, and thereafter polymerization was conducted for further 10 minutes. In addition, the temperature was controlled at 60° C. during polymerization. Subsequently, as the third step, a cyclohexane solution (having a concentration of 20% by mass) containing 6.5 parts by mass of styrene was put in over 10 minutes, and thereafter polymerization was conducted for further 10 minutes. In addition, the temperature was controlled at 60° C. during polymerization. Subsequently, as the fourth step, a cyclohexane solution (having a concentration of 20% by mass) containing 5 parts by mass of butadiene was put in over 5 minutes, and thereafter polymerization was conducted for further 10 minutes. In addition, the temperature was controlled at 60° C. during polymerization. The structure of the block copolymer thus obtained was "A1-B1-A2-B2". In addition, the A1 and A2 were styrene blocks, the B1 and B2 were butadiene blocks, and the content of the butadiene block B2 at the terminal was 5.0% by mass.

Subsequently, the hydrogenation catalyst was added to the obtained block copolymer by an amount of 100 ppm in terms of titanium per 100 parts by mass of the block copolymer, and hydrogenation reaction was conducted at a hydrogen pressure of 0.7 MPa and a temperature of 70° C. Thereafter, methanol was added, and subsequently 0.3 parts by mass of octadecyl-3-(3,5-di-t-butyl-4-hydroxyphenyl)propionate was added as a stabilizer to the block copolymer. The hydrogenated block copolymer (b-1) obtained had a degree of hydrogenation of 98 mol %, an MFR of 5 g/10 min, and a styrene content of 13% by mass, and the butadiene block portion had an amount of vinyl bond before hydrogenation of 78 mol %, weight average molecular weight of 160000 and a molecular weight distribution of 1.05. The analysis results of the hydrogenated block copolymer (b-1) obtained are shown in Table 1.

<Hydrogenated Block Copolymer (b-2)>

A hydrogenated block copolymer (b-2) was produced in the same manner as the hydrogenated block copolymer (b-1) except that the amount of Bu-Li was set to 0.065 parts by mass based on 100 parts by mass of all the monomers, the amount of TMEDA was set to 1.8 mol based on 1 mol of Bu-Li, the amount of styrene in the first and the third step was set to 6.5 parts by mass, and the amount of butadiene in the second step was set to 87 parts by mass. The structure of the block copolymer thus obtained was "A-B-A". In addition, the A was a styrene block and the B was a butadiene block.

The hydrogenated block copolymer (b-2) obtained had a styrene content of 13% by mass, an amount of vinyl bond before hydrogenation of a butadiene block portion of 79 mol %, a weight average molecular weight of 162000, a number average molecular weight of 154000, and a molecular weight distribution of 1.05. Moreover, the hydrogenated block copolymer (b-2) obtained had a degree of hydrogenation of 98 mol % and an MFR of 4.8 g/10 min. The analysis results of the hydrogenated block copolymer (b-2) obtained are shown in Table 1.

<Hydrogenated Block Copolymer (c-1)>

Batch polymerization was conducted using a vessel type reactor provided with a stirring apparatus and a jacket and having an internal volume of 10 L. First of all, 1 L of cyclohexane was charged, and then 0.11 parts by mass of Bu-Li based on 100 parts by mass of all the monomers and 0.45 mol of TMEDA based on 1 mol of Bu-Li were added. As the first step, a cyclohexane solution (having a concentration of 20% by mass) containing 9 parts by mass of styrene was put in over 10 minutes, and thereafter polymerization was conducted for further 10 minutes. In addition, the temperature was controlled at 60° C. during polymerization. Subsequently, as the second step, a cyclohexane solution (having a concentration of 20% by mass) containing 82 parts by mass of butadiene was put in over 60 minutes, and thereafter polymerization was conducted for further 10 minutes. In addition, the temperature was controlled at 60° C. during polymerization. Subsequently, as the third step, a cyclohexane solution (having a concentration of 20% by mass) containing 9 parts by mass of styrene was put in over 10 minutes, and thereafter polymerization was conducted for further 10 minutes. In addition, the temperature was controlled at 60° C. during polymerization. The structure of the block copolymer thus obtained was "A-B-A". In addition, the A was a styrene block and the B was a butadiene block.

Subsequently, the hydrogenation catalyst was added to the obtained block copolymer by an amount of 100 ppm in terms of titanium per 100 parts by mass of the block copolymer, and hydrogenation reaction was conducted at a hydrogen pressure of 0.7 MPa and a temperature of 70° C. Thereafter, methanol was added, and subsequently 0.3 parts by mass of octadecyl-3-(3,5-di-t-butyl-4-hydroxyphenyl)propionate was added as a stabilizer to the block copolymer. The hydrogenated block copolymer (c-1) obtained had a degree of hydrogenation of 98 mol %, an MFR of 4.5 g/10 min, and a styrene content of 18% by mass, and the butadiene block portion had an amount of vinyl bond before hydrogenation of 50 mol %, weight average molecular weight of 110000, number average molecular weight of 105000, and a molecular weight distribution of 1.05. The analysis results of the hydrogenated block copolymer (c-1) obtained are shown in Table 1.

<Hydrogenated Block Copolymer (c-2)>

A hydrogenated block copolymer (c-2) was produced in the same manner as the hydrogenated block copolymer (c-1) except that the amount of Bu-Li was set to 0.135 parts by mass based on 100 parts by mass of all the monomers, the amount of TMEDA was set to 0.5 mol based on 1 mol of Bu-Li, the amount of styrene in the first and the third step was set to 15 parts by mass, and the amount of butadiene in the second step was set to 70 parts by mass. The structure of the block copolymer thus obtained was "A-B-A". In addition, the A was a styrene block and the B was a butadiene block.

The hydrogenated block copolymer (c-2) obtained had a styrene content of 31% by mass, an amount of vinyl bond before hydrogenation of a butadiene block portion of 49 mol %, a weight average molecular weight of 75000, a number average molecular weight of 71500, and a molecular weight distribution of 1.05. Moreover, the hydrogenated block copolymer (c-2) obtained had a degree of hydrogenation of 98 mol % and an MFR of 4.3 g/10 min. The analysis results of the hydrogenated block copolymer (c-2) obtained are shown in Table 1.

TABLE 1

| Hydrogenated block copolymer | Block structure | Amount of terminal block B2 (% by mass) | Degree of hydrogenation (mol %) | Styrene content (% by mass) | MFR (g/10 min) | Amount of vinyl bond (mol %) |
|---|---|---|---|---|---|---|
| Hydrogenated block copolymer (b-1) | A1-B1-A2-B2 | 5.0 | 98 | 13 | 5 | 78 |
| Hydrogenated block copolymer (b-2) | A-B-A | — | 98 | 13 | 4.8 | 79 |
| Hydrogenated block copolymer (c-1) | A-B-A | — | 98 | 18 | 4.5 | 50 |
| Hydrogenated block copolymer (c-2) | A-B-A | — | 98 | 31 | 4.3 | 49 |

<Polyolefin Resin (d)>
PO (1): polyethylene-based resin ["Ceridust 3620" (trade name), manufactured by Clariant (Japan) K.K., and number average molecular weight=3100]
PO (2): polyethylene-based resin ["Novatec HD HY331" (trade name), manufactured by Japan Polypropylene Corporation, and number average molecular weight=70000]
PO (3): polypropylene-based resin ["High WAX NP500" (trade name), manufactured by Mitsui Chemicals Inc., and number average molecular weight=8000]

Examples 1 to 11, and 14, and Comparative Examples 1 to 11

The polypropylene-based resins (a), hydrogenated block copolymers (b), hydrogenated block copolymers (c), and polyolefin resin (d) obtained in the manner as described above were dry-blended in a blending ratio shown in Table 2 and melt-kneaded with a twin screw extruder having L/D=42 and 30 mmϕ (D: screw diameter and L: screw effective length) at 200° C., 350 rpm, and an extrusion amount of 5 kg/h to obtain pellets of resin compositions of Examples 1 to 11, and 14, and Comparative Examples 1 to 11. These pellets were subjected to extrusion molding with a single screw extruder (40 mmϕ) and a T-die at 200 to 230° C. and an extrusion amount of 5 kg/h, with a T-die lip opening of 0.5 mm and a slit width of the T-die of 400 mm, and at a surface temperature of the first and second cooling rolls of 55° C. to prepare sheet-shaped molded bodies having a thickness of about 0.2 mm, about 0.25 mm, and about 0.5 mm corresponding to respective examples. The thickness was adjusted by changing the number of revolution of the screw, take-off speed, T-die lip opening, and so on. The measurement results of the physical properties of obtained sheet-shaped molded bodies are shown in Table 2.

Example 12

Sheet-shaped molded bodies were prepared in the same manner as in Example 8 except that the surface temperature of the first and second cooling rolls were set to 25° C.

Example 13

Sheet-shaped molded bodies were prepared in the same manner as in Example 8 except that the surface temperature of the first and second cooling rolls were set to 90° C.

TABLE 2

| | Example 1 | Example 2 | Example 3 | Example 4 | Example 5 | Example 6 | Example 7 | Example 8 | Example 9 | Example 10 | Example 11 | Example 12 | Example 13 | Example 14 |
|---|---|---|---|---|---|---|---|---|---|---|---|---|---|---|
| Polypropylene-based resin (a) | | | | | | | | | | | | | | |
| PP (1) | 70 | 70 | 70 | 40 | 80 | 50 | | 70 | 70 | 70 | 70 | 70 | 70 | 70 |
| PP (2) | | | | | | | 50 | | | | | | | |
| Hydrogenated block copolymer (b) | | | | | | | | | | | | | | |
| Hydrogenated block copolymer (b-1) | 10 | 15 | 20 | 20 | 10 | 20 | 20 | 15 | 15 | 15 | 15 | 15 | 15 | |
| Hydrogenated block copolymer (b-2) | | | | | | | | | | | | | | 15 |
| Hydrogenated block copolymer (c) | | | | | | | | | | | | | | |
| Hydrogenated block copolymer (c-1) | 20 | 15 | 10 | 40 | 10 | 30 | 30 | 15 | 15 | 15 | 15 | 15 | 15 | 15 |

TABLE 2-continued

|  | Example 1 | Example 2 | Example 3 | Example 4 | Example 5 | Example 6 | Example 7 | Example 8 | Example 9 | Example 10 | Example 11 | Example 12 | Example 13 | Example 14 |
|---|---|---|---|---|---|---|---|---|---|---|---|---|---|---|
| Hydrogenated block copolymer (c-2) | | | | | | | | | | | | | | |
| Polyolefin resin (d) | | | | | | | | | | | | | | |
| PO (1)* | | | | | | | | 0.5 | 10 | | | 0.5 | 0.5 | |
| PO (2)* | | | | | | | | | | 0.5 | | | | |
| PO (3)* | | | | | | | | | | | 0.5 | | | |
| Physical property | | | | | | | | | | | | | | |
| Haze value (%) in terms of thickness of 0.2 mm | 8.1 | 7.8 | 7.2 | 4.7 | 8.2 | 4.5 | 5.1 | 2.4 | 5.4 | 4.3 | 3.8 | 4.6 | 5.2 | 7.5 |
| Heat sealability | ○ | ◎ | ○ | ◎ | ◎ | ◎ | Δ | ◎ | ◎ | ◎ | ◎ | ◎ | ◎ | ◎ |
| Flexibility | Δ | ○ | ◎ | ◎ | Δ | ◎ | Δ | ○ | Δ | Δ | ○ | ○ | ○ | Δ |
| Transparency | ○ | ◎ | ◎ | ◎ | ○ | ◎ | Δ | ◎ | ○ | ○ | ○ | Δ | Δ | ○ |
| Shock resistance | ○ | ○ | ○ | ○ | ○ | ○ | ◎ | ○ | ○ | ○ | ○ | ○ | ○ | ○ |
| Low stickiness | ○ | ○ | ○ | ○ | ◎ | ○ | ○ | ○ | ○ | ○ | ○ | ○ | ○ | ◎ |
| Surface smoothness | Δ | Δ | Δ | Δ | Δ | Δ | Δ | ◎ | ○ | ○ | ○ | Δ | Δ | Δ |

*number of parts of polyolefin resin (d): number of parts based on 100 parts by mass of total content of hydrogenated block copolymer (b) and hydrogenated block copolymer (c)

TABLE 3

|  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 | Comparative Example 11 |
|---|---|---|---|---|---|---|---|---|---|---|---|
| Polypropylene-based resin (a) | | | | | | | | | | | |
| PP (1) | 100 | | 70 | 70 | | | 70 | 70 | 70 | 30 | 95 |
| PP (2) | | 100 | | | 60 | 60 | | | | | |
| Hydrogenated block copolymer (b) | | | | | | | | | | | |
| Hydrogenated block copolymer (b-1) | | | 30 | | 40 | | 25 | 5 | 15 | 35 | 2.5 |
| Hydrogenated block copolymer (b-2) | | | | | | | | | | | |
| Hydrogenated block copolymer (c) | | | | | | | | | | | |
| Hydrogenated block copolymer (c-1) | | | | 30 | | 40 | 5 | 25 | | 35 | 2.5 |
| Hydrogenated block copolymer (c-2) | | | | | | | | | 15 | | |
| Polyolefin resin (d) | | | | | | | | | | | |
| PO (1)* | | | | | | | | | | | |
| PO (2)* | | | | | | | | | | | |
| PO (3)* | | | | | | | | | | | |
| Physical property | | | | | | | | | | | |
| Haze value (%) in terms of thickness of 0.2 mm | 11.8 | 14.5 | 6.6 | 9.6 | 8.3 | 13.6 | 6.8 | 9.9 | 15.2 | 8.0 | 10.4 |
| Heat sealability | X | X | Δ | X | X | X | ○ | Δ | X | ◎ | X |
| Flexibility | X | X | ◎ | Δ | Δ | X | ○ | X | Δ | ◎ | X |
| Transparency | Δ | X | ◎ | ○ | ○ | X | ◎ | ○ | X | ○ | Δ |

TABLE 3-continued

|  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 | Comparative Example 11 |
| --- | --- | --- | --- | --- | --- | --- | --- | --- | --- | --- | --- |
| Shock resistance | X | ◯ | Δ | ◯ | ◎ | ◎ | Δ | ◯ | ◯ | X | Δ |
| Low stickiness | ◯ | ◎ | X | Δ | ◎ | ◎ | X | ◯ | ◯ | X | ◯ |
| Surface smoothness | Δ | Δ | Δ | Δ | Δ | Δ | Δ | Δ | Δ | X | Δ |

*number of parts of polyolefin resin (d): number of parts based on 100 parts by mass of total content of hydrogenated block copolymer (b) and hydrogenated block copolymer (c)

It is understood from the results shown in Table 2 that the resin compositions obtained in Examples 1 to 14 and the sheet-shaped molded bodies made of the resin compositions have a favorable balance among heat sealability, flexibility, transparency, shock resistance, and low stickiness.

To the contrary, the results of Comparative Examples 1 to 11 (Table 3) were as described in (1) to (8) below.

(1) It is understood that the sheet-shaped molded body made of the resin composition, which does not contain the hydrogenated block copolymer (b) and the hydrogenated block copolymer (c) and which is obtained in Comparative Example 1, is inferior in heat sealability, flexibility, and shock resistance. Further, it is understood that the sheet-shaped molded body made of the resin composition obtained in Comparative Example 2 is inferior in heat sealability, flexibility, and transparency.

(2) It is understood that the sheet-shaped molded body made of the resin composition, which does not contain the hydrogenated block copolymer (c) and which is obtained in Comparative Example 3, is inferior in low stickiness. Further, it is understood that the sheet-shaped molded body made of the resin composition obtained in Comparative Example 5 is inferior in heat sealability.

(3) It is understood that the sheet-shaped molded body made of the resin composition, which does not contain the hydrogenated block copolymer (b) and which is obtained in Comparative Example 4, is inferior in heat sealability. Further, it is understood that the sheet-shaped molded body made of the resin composition obtained in Comparative Example 6 is inferior in heat sealability, flexibility, and transparency.

(4) It is understood that the sheet-shaped molded body made of the resin composition obtained in Comparative Example 7 is inferior in low stickiness because the value of the mass ratio of the hydrogenated block copolymer (b) to the hydrogenated block copolymer (c), (b)/(c), is large.

(5) It is understood that the sheet-shaped molded body made of the resin composition obtained in Comparative Example 8 is inferior in flexibility because the value of the mass ratio of the hydrogenated block copolymer (b) to the hydrogenated block copolymer (c), (b)/(c), is small.

(6) It is understood that the sheet-shaped molded body made of the resin composition obtained in Comparative Example 9 is inferior in heat sealability and transparency because the difference between the total content of the aromatic vinyl compound unit in the hydrogenated block copolymer (b) and the total content of the aromatic vinyl compound unit in the hydrogenated block copolymer (c) is large.

(7) It is understood that the sheet-shaped molded body made of the resin composition obtained in Comparative Example 10 is inferior in shock resistance and low stickiness because the value of the mass ratio of the polypropylene-based resin (a) to the hydrogenated block copolymer (b) and the hydrogenated block copolymer (c), (a)/((b)+(c)), is small. Further, it is understood that the sheet-shaped molded body made of the resin composition obtained in Comparative Example 10 is hard to mold and is inferior in surface smoothness because blocking occurs between the sheet-shaped molded bodies.

(8) It is understood that the sheet-shaped molded body made of the resin composition obtained in Comparative Example 11 is inferior in heat sealability and flexibility because the value of the mass ratio of the polypropylene-based resin (a) to the hydrogenated block copolymer (b) and the hydrogenated block copolymer (c), (a)/((b)+(c)), is large.

The present application is based on the Japanese patent application (Japanese Patent Application No. 2014-049205) filed on Mar. 12, 2014, the contents of which are incorporated herein by reference in their entirety.

INDUSTRIAL APPLICABILITY

The polypropylene-based resin composition and sheet-shaped molded body according to the present invention are excellent in any of heat sealability, flexibility, transparency, shock resistance, low stickiness, and surface smoothness. The sheet-shaped molded body according to the present invention can suitably be used, utilizing these properties, as molded bodies for medical use, such as transfusion bags, and for use applications of packaging of foodstuffs and clothes.

The invention claimed is:

1. A resin composition comprising:
a polypropylene-based resin (a) having a number average molecular weight of 50000 or higher;
a hydrogenated block copolymer (b);
a hydrogenated block copolymer (c); and
a polyolefin resin (d) having a number average molecular weight of lower than 50000,
wherein the hydrogenated block copolymer (b) comprises: at least one polymer block A comprising an aromatic vinyl compound unit as a main constituent; and at least one polymer block B comprising a conjugated diene compound unit as a main constituent,
a total content of the aromatic vinyl compound unit in the hydrogenated block copolymer (b) is 5 to 30% by mass,
80 mol % or more of all the conjugated diene compound units in the hydrogenated block copolymer (b) is hydrogenated,
an amount of vinyl bond of the hydrogenated block copolymer (b) before hydrogenation is more than 60 mol %,
the hydrogenated block copolymer (c) comprises: at least one polymer block C comprising an aromatic vinyl compound unit as a main constituent; and at least one polymer block D comprising a conjugated diene compound unit as a main constituent,
a total content of the aromatic vinyl compound unit in the hydrogenated block copolymer (c) is 5 to 30% by mass, 80 mol % or more of all the conjugated diene compound units in the hydrogenated block copolymer (c) is hydrogenated, an amount of vinyl bond of the hydrogenated block copolymer (c) before hydrogenation is 40 to 60 mol %, a mass ratio of a content of the hydrogenated block copolymer (b) to a content of the hydrogenated block copolymer (c), (b)/(c), is 20/80 to 80/20, a mass ratio of a content of the polypropylene-based resin (a) to the total content of the hydrogenated block copolymer (b) and the hydrogenated block copolymer (c), (a)/((b)+(c)), is 40/60 to 90/10, and a content of the polyolefin resin (d) in the resin composition is 0.01 to 1.5 parts by mass based on 100 parts by mass of the total content of the hydrogenated block copolymer (b) and the hydrogenated block copolymer (c).

2. The resin composition according to claim 1, wherein the polypropylene-based resin (a) comprises a propylene-α-olefin random copolymer having a propylene content of 98% by mass or less.

3. The resin composition according to claim 1, wherein the polyolefin resin (d) is a homopolymer of ethylene.

4. The resin composition according to claim 1, wherein the total content of the aromatic vinyl compound unit in the hydrogenated block copolymer (b) is 8 to 17% by mass.

5. The resin composition according to claim 1,
wherein a difference between the total content of the aromatic vinyl compound unit in the hydrogenated block copolymer (b) and the total content of the aromatic vinyl compound unit in the hydrogenated block copolymer (c) is 8% by mass or less, and an average of the total content of the aromatic vinyl compound unit in the hydrogenated block copolymer (b) and the total content of the aromatic vinyl compound unit in the hydrogenated block copolymer (c) is 9 to 20% by mass.

6. The resin composition according to claim 1,
wherein the hydrogenated block copolymer (b) is represented by a structure of A1-B1-A2-B2, A1 and A2 in the structure are included in the polymer block A and are same or different, B1 and B2 in the structure are included in the polymer block B, and a content of B2 in the hydrogenated block copolymer (b) is 0.1 to 9.1% by mass.

7. The resin composition according to claim 1, wherein the mass ratio, (b)/(c), is 40/60 to 60/40.

8. The resin composition according to claim 1, wherein the mass ratio, (a)/((b)+(c)), is 60/40 to 80/20.

9. The resin composition according to claim 1, wherein the content of the hydrogenated block copolymer (b) is more than 5% by mass.

10. A sheet-shaped molded body, comprising the resin composition according to claim 1.

11. The sheet-shaped molded body comprising the resin composition according to claim 1,
wherein the sheet-shaped molded body has a haze (%) of 4% or less in terms of a thickness of 0.2 mm.

12. A packaging material for medical use, foodstuffs or clothes, comprising the sheet-shaped molded body according to claim 10.

13. The resin composition according to claim 2,
wherein the polypropylene-based resin (a) has a number average molecular weight of 50000 or higher, and the resin composition further comprises 0.01 to 1.5 parts by mass of a polyolefin resin (d) having a number average molecular weight of lower than 50000, based on 100 parts by mass of the total content of the hydrogenated block copolymer (b) and the hydrogenated block copolymer (c).

14. The resin composition according to claim 2, wherein the polyolefin resin (d) is a homopolymer of ethylene.

* * * * *